United States Patent
Isomura

(10) Patent No.: US 7,614,505 B2
(45) Date of Patent: Nov. 10, 2009

(54) CERAMIC FILTER AND REGENERATING METHOD THEREOF

(75) Inventor: Manabu Isomura, Tsushima (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/850,700

(22) Filed: Sep. 6, 2007

(65) Prior Publication Data

US 2008/0105627 A1    May 8, 2008

(30) Foreign Application Priority Data

Nov. 8, 2006    (JP)    ............................. 2006-302609

(51) Int. Cl.
  *B01D 29/46*    (2006.01)
  *B01D 41/00*    (2006.01)
  *B01D 39/10*    (2006.01)
  *B29C 44/04*    (2006.01)
  *B01D 39/06*    (2006.01)

(52) U.S. Cl. ............. 210/490; 210/500.25; 210/500.26; 210/510.1; 55/523; 55/524; 264/45.1

(58) Field of Classification Search ............ 210/500.25, 210/490, 500.26, 510.1; 95/50, 51; 428/702; 55/523, 524; 264/41, 45.1
See application file for complete search history.

(56) References Cited

U.S. PATENT DOCUMENTS 4,412,921 A * 11/1983 Leung et al. ........... 210/500.25
4,946,592 A * 8/1990 Galaj et al. ................. 210/490
5,196,380 A * 3/1993 Shadman ......................... 502/4
5,276,244 A * 1/1994 Lin et al. ..................... 585/818
5,503,873 A   4/1996 Gavalas et al.
6,464,881 B2 * 10/2002 Thoraval ..................... 210/652
6,719,147 B2 * 4/2004 Strano et al. ................. 210/490
6,818,333 B2 * 11/2004 Chau et al. ................... 428/702
7,014,680 B2 * 3/2006 Nakayama et al. ............. 95/51
7,255,725 B2 * 8/2007 Chau et al. ..................... 95/50

FOREIGN PATENT DOCUMENTS

| JP | 2002-066280 A1 | 3/2002 |
| JP | 2006-212480 | 8/2006 |
| WO | 95/03885 A1 | 2/1995 |
| WO | 01/97956 A1 | 12/2001 |

OTHER PUBLICATIONS

Asaeda, Masashi and Yamasaki, Shin "Separation of Inorganic/Organic Gas Mixtures by Porous Silica Membranes" Separation and Purification Technology 25 (2001) p. 151-159.

* cited by examiner

*Primary Examiner*—Ana M Fortuna
(74) *Attorney, Agent, or Firm*—Burr & Brown

(57) ABSTRACT

A ceramic filter includes a porous base member formed of a ceramic porous body, a carbonaceous membrane formed on the porous base member, and an inorganic separation membrane formed on the carbonaceous membrane. According to a method for the ceramic filter for reuse, the deteriorated ceramic filter is thermally treated to remove the carbonaceous membrane and the inorganic membrane from the porous base member, then the carbonaceous membrane is formed on the porous base member, and the inorganic membrane is formed on the carbonaceous membrane.

7 Claims, 4 Drawing Sheets

◇ SILICA MEMBRANE (PERMEATION-SIDE CONCENTRATION)
◆ SILICA MEMBRANE (WATER FLUX)
□ CARBONACEOUS MEMBRANE (PERMEATION-SIDE CONCENTRATION)
■ CARBONACEOUS MEMBRANE (WATER FLUX)

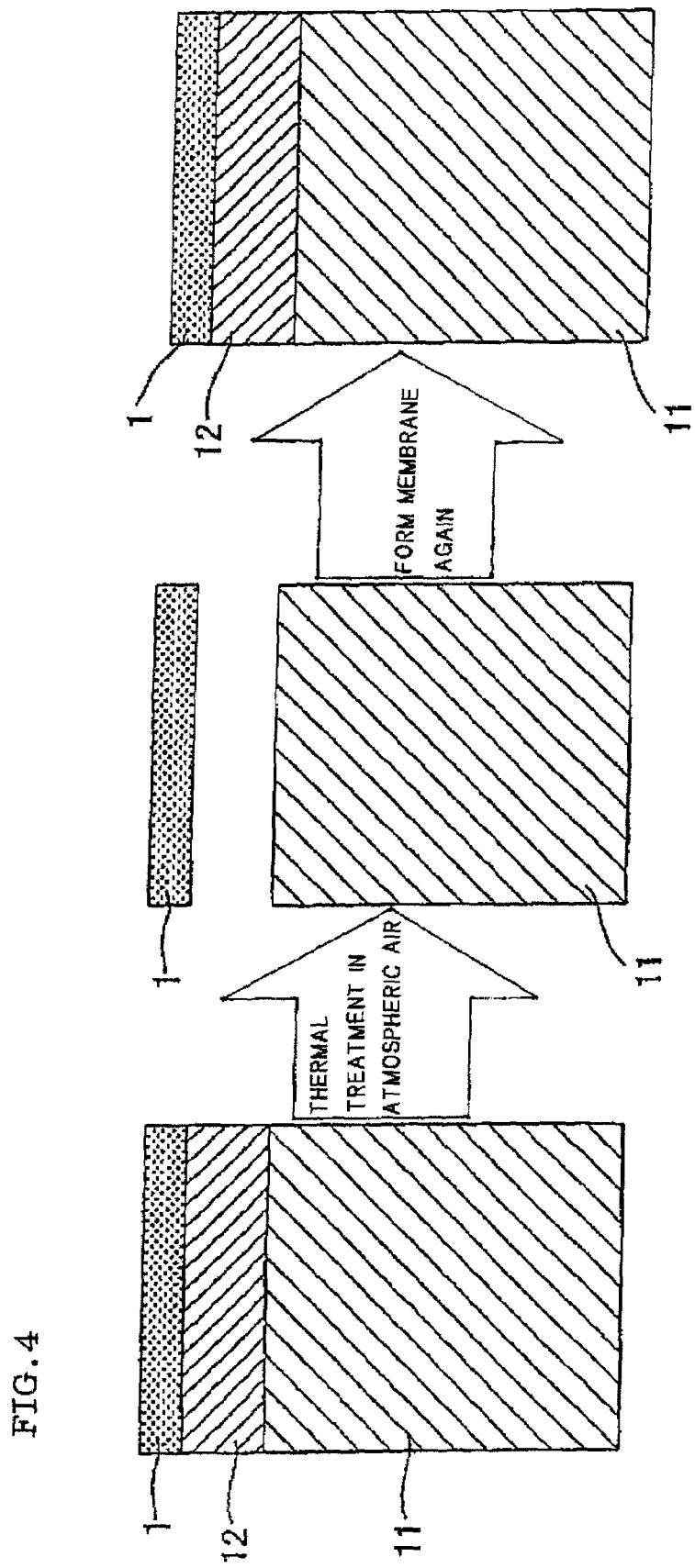

CERAMIC FILTER AND REGENERATING METHOD THEREOF

BACKGROUND OF THE INVENTION AND RELATED ART

The present invention relates to a ceramic filter and a method of regenerating the filter. More particularly, it relates to a ceramic filter formed with reduced membrane formation times and having a high water permeation performance and a high separation performance, and a method of regenerating the filter.

Heretofore, various methods of forming an inorganic separation membrane on a porous base member have been known. For example, a hot coating process is known (see Non-Patent Document 1). This is a method of rubbing a tube base member with cloth containing a silica sol to apply the sol, thereby forming the inorganic separation membrane on an outer surface of the heated tube base member.

A method of forming the inorganic separation membrane on an inner surface of a porous base member having a tubular shape or a cylindrical lotus-root-like monolith shape by filtering membrane formation is also known (see Patent Document 1). The outer surface of the porous base member is held at a pressure lower than that of an inner surface thereof which comes in contact with a sol liquid to form the membrane on the inner surface of the porous base member.

On the other hand, examples of a separation membrane having excellent thermal resistance and stability include a carbonaceous membrane, and the carbonaceous membrane formed on the porous base member is known.

[Patent Document 1] Japanese Patent Application Laid-Open No. 2006-212480

[Non-Patent Document 1] Separation and Purification Technology 25 (2001) 151 to 159

As the inorganic separation membrane, for example, a silica membrane has a high permeability and a high separability, but in order to form the silica membrane as the separation membrane on the porous base member, four or five types of silica sols having different particle diameters have to be formed into membranes several times, respectively, membrane formation is performed ten or more times in total, and this increases manufacturing costs.

On the other hand, when the carbonaceous membrane is formed on the porous base member, a coating liquid having the same composition may be formed into membranes about several times, the membrane can inexpensively be manufactured, but the permeation performance of the carbonaceous membrane is inferior to that of an inorganic separation membrane such as the silica membrane.

SUMMARY OF THE INVENTION

An object of the present invention is to provide a ceramic filter formed with less membrane formation times and having a high water permeation performance and a high separation performance. There is also provided a regenerating method of the ceramic filter, capable of inexpensively regenerating the ceramic filter in a case where the filter deteriorates.

The present inventors have found that the above-mentioned object can be achieved by employing a constitution in which a carbonaceous membrane is formed on a porous base member and an inorganic separation membrane is formed on the carbonaceous membrane. It has also been found that in a case where the ceramic filter deteriorates, the filter is thermally treated to form the carbonaceous membrane and the inorganic separation membrane again, whereby the filter can be reused.

That is, according to the present invention, the following ceramic filter and the following regenerating method of the filter are provided.

According to a first aspect of the present invention, a ceramic filter is provided, comprising a porous base member formed of a ceramic porous body, a carbonaceous membrane formed on the porous base member, and an inorganic separation membrane formed on the carbonaceous membrane.

According to second aspect of the present invention, the ceramic filter according to the first aspect is provided, wherein the inorganic separation membrane is one of a silica membrane, a titania membrane, a zirconia membrane and a zeolite membrane.

According to a third aspect of the present invention, the ceramic filter according to the first aspect or second aspect is provided, for dehydration, wherein the inorganic separation membrane is a silica membrane.

According to a fourth aspect of the present invention, the ceramic filter according to any one of the above aspects is provided, wherein the carbonaceous membrane has a membrane thickness of 0.1 to 2 μm.

According to a fifth aspect of the present invention, a method for regenerating a ceramic filter is provided, comprising the steps of thermally treating a ceramic filter according to any one of the first through fourth aspects above to remove the carbonaceous membrane and the inorganic separation membrane from the porous base member, then forming a new carbonaceous membrane on the porous base member, and then forming a new inorganic separation membrane on the carbonaceous membrane.

A constitution in which the carbonaceous membrane is formed on the porous base member and the inorganic separation membrane is formed on the carbonaceous membrane is employed. As a result of this constitution according to the present invention, wherein the ceramic filter deteriorates, the filter can thermally be treated to easily remove the carbonaceous membrane and the inorganic separation membrane from the porous base member, and the carbonaceous membrane and the inorganic separation membrane can be formed anew to inexpensively regenerate the ceramic filter. When the inorganic separation membrane is a silica membrane, the number of membrane formation times may be small, and a ceramic filter for dehydration having a high permeation performance and a high separation performance can be obtained.

BRIEF DESCRIPTION OF THE DRAWINGS

FIG. 4 is an explanatory view of a regenerating method of the ceramic filter of the present invention.

DESCRIPTION OF THE REFERENCE NUMERALS USED IN THE DRAWINGS

1: silica membrane, 10: ceramic filter, 11: porous base member, 12: carbonaceous membrane, 22: partition wall, 23: cell, 25: inlet-side end surface.

DETAILED DESCRIPTION OF THE INVENTION

An embodiment of the present invention will hereinafter be described with reference to the drawings. The present invention is not limited to the following embodiment, and can be changed, modified or improved without departing from the scope of the present invention.

Figure 1:
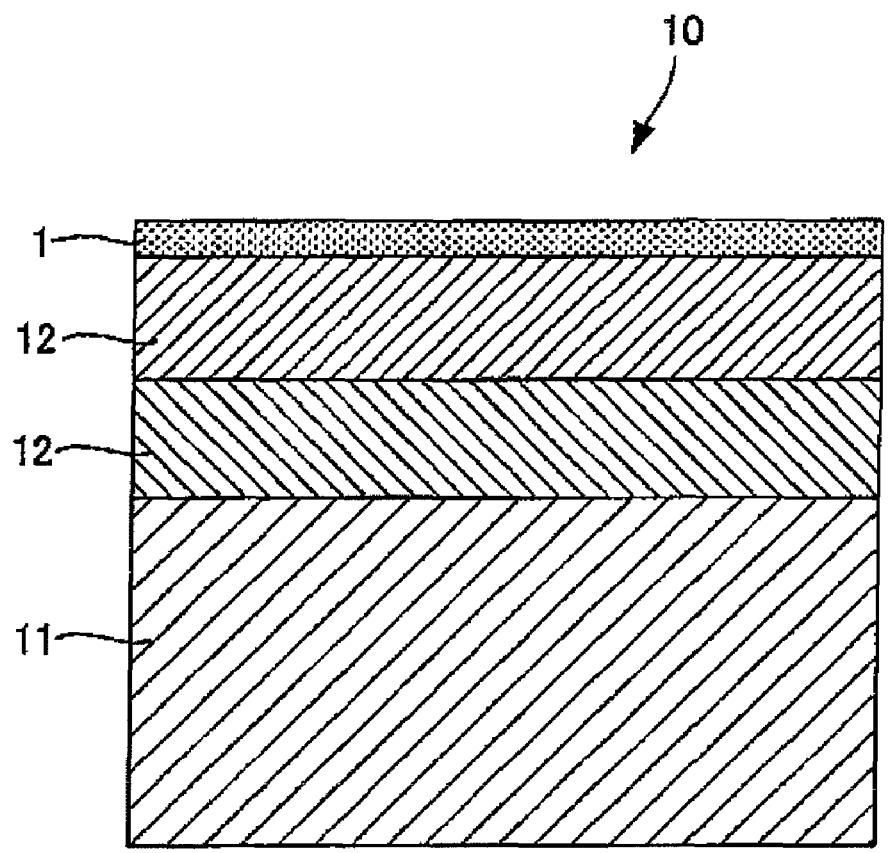
FIG. 1 is a sectional view of a ceramic filter according to one embodiment of the present invention.

FIG. 1 shows a ceramic filter 10 according to the present invention. In the ceramic filter 10, carbonaceous membranes 12 having an average pore diameter that is smaller than that of the porous base member 11 are formed on the porous base member 11, and a silica inorganic separation membrane 1 is formed on the carbonaceous membrane 12. The carbonaceous membrane 12 is a membrane containing 80% or more of carbon, and it is preferable to form one to several carbonaceous membrane layers. The silica membrane 1 may be formed by laminating many layers using silica sol liquids having different concentrations. However, heretofore, to form the silica membrane 1 on the porous base member 11, four or five types of silica membranes 1 having different particle diameters have to be laminated about several times, respectively, but when the carbonaceous membrane 12 is formed as an intermediate layer, the ceramic filter 10 having a high permeability and a high separability can be obtained by laminating only one to a few layers.

The porous base member 11 is formed of a sintered body of ceramic particles or ceramic sol particles in which an average particle diameter of the particles forming the surface layer is in a range of 10 nm to 10 μm. For example, alumina, titania or zirconia particles can be used. The base member includes a large number of pores having an average pore diameter of 1 nm to 1 μm and extending between a front surface and a back surface. As a porous material, alumina may be used, because this material exhibits corrosion resistance, and the pore diameters of a filtering portion scarcely change even with a temperature change, and a sufficient strength can be obtained. However, instead of alumina, a ceramic material such as titania, zirconia, cordierite, mullite or silicon carbide may also be used.

Moreover, the carbonaceous membrane 12 having selectivity and permeability is formed as the separation membrane on the porous base member 11. The carbonaceous membrane 12 has a membrane thickness of 2 μm or less, further preferably 1 μm or less. This is because if the membrane is thick, permeation pressure losses increase, and cracks are sometimes generated in the membrane due to a thermal expansion difference between the separation layer (the silica membrane 1) and the carbonaceous membrane 12. The membrane thickness may be 0.1 μm or more, preferably 0.2 μm or more. If the membrane is excessively thin, a portion wherein any carbonaceous membrane 12 is not formed is generated at the surface of a support member (the porous base member 11), and the filter might not be regenerated. Furthermore, the silica membrane 1 is formed as the inorganic separation membrane on the carbonaceous membrane 12.

Figure 2:
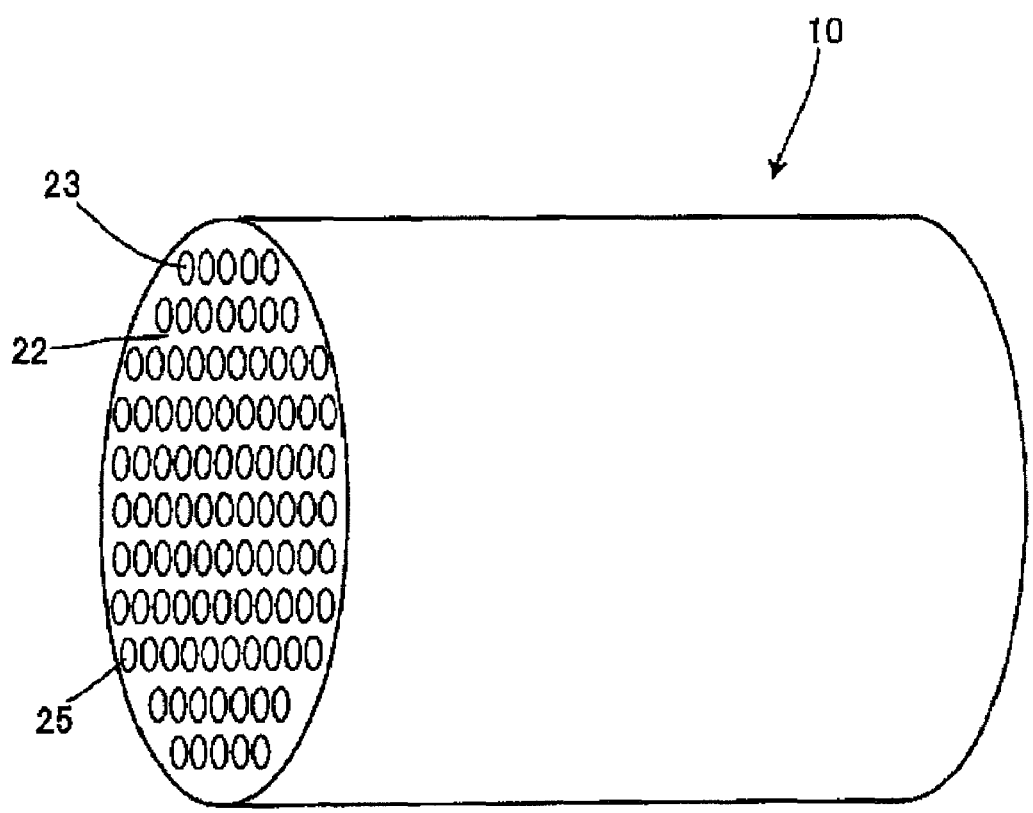
FIG. 2 is a perspective view showing the ceramic filter according to the embodiment of the present invention.

Next, one embodiment of the ceramic filter 10 in which the silica membrane 1 is formed according to the present invention will be described with reference to FIG. 2. The ceramic filter 10 of the present invention forms a monolith shape having a plurality of cells 23 defined by partition walls 22 to form fluid passages in an axial direction. In the present embodiment, the cells 23 have a circular section, and the silica membrane 1 shown in FIG. 1 is formed on inner wall surfaces of the cells. The cells 23 may be formed so as to have a hexagonal or quadrangular section. According to such a structure, for example, when a mixture (e.g., water and acetic acid) is introduced into the cells 23 from an inlet-side end surface 25, one of constituting elements of the mixture is separated at the silica membrane 1 and the carbonaceous membranes 12 formed on the inner walls of the cells 23, passed through the porous partition walls 22 and discharged from an outermost wall of the ceramic filter 10, so that the mixture can be separated. That is, the silica membrane 1 and the carbonaceous membranes 12 formed in the ceramic filter 10 can be used as separation membranes, and have a high separation characteristic with respect to, for example, water and acetic acid.

The porous base member 11 as a base member main body is formed as a columnar monolith-type filter element formed of a porous material by extrusion or the like. As the porous material, a ceramic material such as alumina, titania, zirconia, cordierite, mullite or silicon carbide may be used, because this material has a resistance to corrosion, the pore diameters of the filtering portion scarcely change even with the temperature change and the sufficient strength can be obtained. The porous base member 11 is a porous body whose surface to be provided with the membrane has pore diameters of preferably 1 nm to 1 μm and which has a large number of pores having small pore diameters. On the surface of this porous body, a porous membrane having the pore diameters in the above range may be formed.

Since the silica membrane 1 and the carbonaceous membranes 12 of the present invention can be formed on an inner peripheral surface (an inner wall surface) of the porous base member 11, a comparatively long cylindrical base member or a lotus-root-like porous base member may preferably be used.

Moreover, the carbonaceous membrane 12 is formed on the porous base member 11. The carbonaceous membrane 12 is formed by forming a membrane on the porous base member 11 by use of a precursor solution which forms the carbonaceous membrane 12 by a dipping process, and carbonizing the membrane in, for example, nitrogen at 700° C. The precursor solution which forms the carbonaceous membrane 12 is formed by mixing a thermosetting resin such as a phenol resin, a melamine resin, an urea resin, a furan resin, polyimide or an epoxy resin, a thermoplastic resin such as polyethylene or a cellulose-base resin with an organic solvent such as methanol, acetone, tetrahydrofuran or NMP, water or the like. The carbonization can be performed in a reduction atmosphere such as vacuum, argon or helium instead of a nitrogen atmosphere. In general, when the carbonization is performed at 400° C. or less, the resin is not sufficiently carbonized, and selectivity and flux of a molecular sieve membrane deteriorate. On the other hand, when the carbonization is performed at 1000° C. or more, the pore diameters decrease to decrease the flux.

Subsequently, the silica membrane 1 is formed on the carbonaceous membrane 12. First, a coating liquid (a silica sol liquid) for forming the silica membrane 1 is prepared. To prepare the coating liquid, tetraethoxy silane is hydrolyzed in the presence of nitric acid at 60° C. for three hours to form a sol liquid, and the sol liquid is diluted with ethanol and regulated so as to obtain a concentration of 0.7 mass % in terms of silica. The liquid may be diluted with water instead of ethanol, but when the liquid is diluted with ethanol, the membrane can be formed to be thin at one membrane formation time, and a membrane having a high flux can be formed.

After the silica sol liquid is deposited on the carbonaceous membrane 12 by the dipping process or the like and dried, a temperature is raised, retained at 500° C. for one hour and lowered at a ratio of 100° C./hr, whereby the silica membrane 1 can be formed. Needless to say, the silica sol liquid, a manner of preparing the coating liquid and firing conditions are not limited to those of the embodiment.

Figure 3:
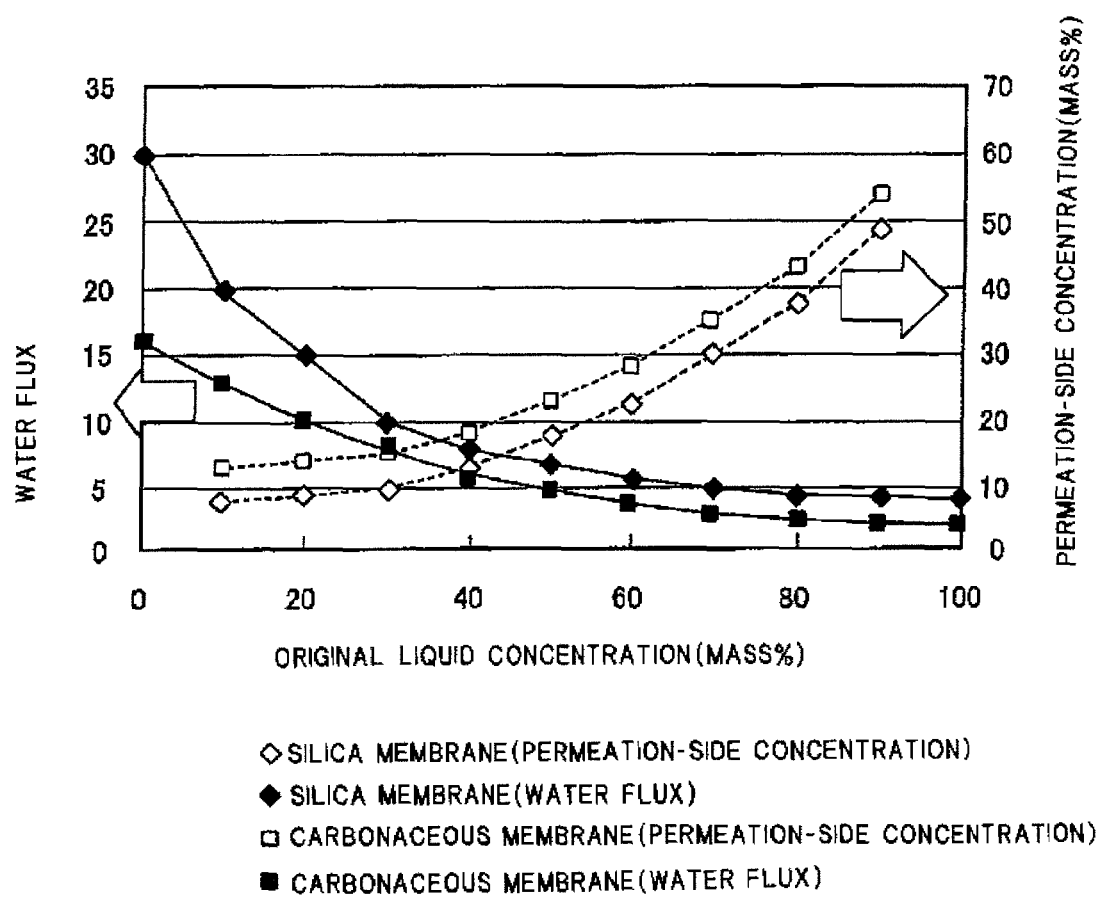
FIG. 3 is an explanatory view of a treatment of a mixed liquid by the ceramic filter of the present invention.

In the ceramic filter 10 formed as described above, it is expected that the water flux speed is limited because the carbonaceous membrane 12 has a lower flux than that of the silica membrane 1, but unlike the expectation, a mixed liquid can efficiently be treated. This will be described with reference to FIG. 3. The abscissa of FIG. 3 indicates an original liquid concentration, 0 mass % indicates a case where there is not any original liquid, and 100 mass % indicates the original liquid only. For example, a mixed liquid of ethanol and water having an original liquid (ethanol) concentration of 70 mass % is considered. In a case where the original liquid concentration is 70 mass %, when the liquid is passed through the silica membrane 1, a water flux is 5 and a permeation-side concentration is 30 mass %. In a case where the mixed liquid is passed through the carbonaceous membrane 12, since the original liquid concentration is 30 mass %, the water flux is 7, and the permeation-side concentration is 15 mass %. That is, the original liquid concentration is 70 mass %, but the liquid is separated so as to have a concentration of 15 mass %. Moreover, the water flux at the silica membrane 1 is 5 whereas the water flux at the carbonaceous membrane 12 is 7, and the carbonaceous membrane 12 does not limit the speed in this treatment.

That is, when the original liquid containing water, that is, the mixed liquid passes through the silica membrane 1, a liquid containing much water is obtained. Moreover, when the original liquid has a high water concentration, the water permeation performance of the carbonaceous membrane 12 improves. Therefore, as compared with a case where the original liquid is directly passed through the carbonaceous membrane 12, the water flux at the carbonaceous membrane 12 increases. Therefore, the silica membrane 1 having a high separability may be used so that the flux of the carbonaceous membrane 12 is larger than that of the silica membrane 1. That is, the mixed liquid is treated by the silica membrane 1 having a high water flux and a high separation factor, and then the mixed liquid passed through the silica membrane 1 is treated by the carbonaceous membrane 12, whereby the carbonaceous membrane 12 does not limit the water flux, and the mixed liquid can be separated at a higher ratio. In other words, the ceramic filter 10 in which the carbonaceous membrane 12 and the silica membrane 1 are formed on the porous base member 11 can be manufactured with less membrane formation times, but has a high water permeation performance and a high separation performance.

Next, a regenerating method of the ceramic filter 10 will be described with reference to FIG. 4. When the silica membrane 1 deteriorates during use of the ceramic filter 10, the carbonaceous membrane 12 and the silica membrane 1 are formed on the porous base member 11 in this order. Therefore, when the filter is thermally treated in the atmospheric air, the carbonaceous membrane 12 is burnt, and the carbonaceous membrane 12 and the silica membrane 1 can be removed. That is, in a case where the silica membrane 1 which is the separation layer (the inorganic separation membrane) deteriorates, the ceramic filter 10 is thermally treated in the atmospheric air at a temperature lower than a firing temperature of the support body (the porous base member 11) in a range of 500 to 900° C., whereby a portion of the carbonaceous membrane 12 is burnt and eliminated. As a result, the silica membrane 1 which has been formed on the carbonaceous membrane 12 is simultaneously removed. Afterward, the carbonaceous membrane 12 and the silica membrane 1 are formed again on the porous base member 11 left after the thermal treatment, so that the porous base member 11 can be reused.

In the above embodiment, a case where the silica membrane 1 is formed as the inorganic separation membrane has been described, but the inorganic separation membrane is not limited to the silica membrane 1. As the inorganic separation membrane, a membrane having a high separability and a high permeability is preferable. Instead of the silica membrane, a titania membrane, a zirconia membrane, a zeolite membrane or the like may be used.

EXAMPLES

The present invention will hereinafter be described in accordance with examples in more detail, but the present invention is not limited to these examples.

(1) Support Body

On an outer surface of an alumina porous base member having an average pore diameter of 5 μm, an outer diameter of 10 mm, an inner diameter of 7 mm and a length of 40 mm, a first porous membrane which was an alumina porous layer having pore diameters of 1 μm and a thickness of 100 μm, and a second porous membrane which was an alumina porous layer having pore diameters of 0.1 μm and a thickness of 20 μm were formed to constitute a support body (a porous base member).

(2) Formation of Carbonaceous Membrane

Polyamide acid (AURUM (trade name) manufactured by Mitsui Chemicals, Ltd.) as a precursor of polyimide was diluted with N,N-dimethyl acetoamide to obtain a polyamide acid solution (I) having a polyamide acid content of 1 mass %. The support body (1) was hung, submerged into the polyamide acid solution (I) at a constant speed, then pulled up again at a constant speed to apply polyamide acid, thermally treated in the atmospheric air at 90° C. for 30 minutes and at 300° C. for one hour, and thermally treated in a nitrogen atmosphere at 700 to 800° C. for six hours to obtain a carbonaceous membrane as a support body of an inorganic separation membrane. The carbonaceous membrane had a membrane thickness of 0.6 μm.

(3) Formation of Inorganic Separation Membrane

After forming various inorganic separation membranes (separation layers) on the support body of the carbonaceous membrane of the above (2), to confirm whether or not a filter can be regenerated, the membranes were thermally treated in the atmospheric air at 500 to 1000° C. to remove the carbonaceous membrane and the inorganic separation membrane, then a carbonaceous membrane was formed again, and an inorganic separation membrane was formed on the carbonaceous membrane. It was evaluated whether or not the membrane could be regenerated on the basis of membrane (separation layer) performances before and after the regeneration.

TABLE 1

| No. | Material of separation layer | Thermal treatment conditions for membrane removal | Membrane performances before and after reproduction |
|---|---|---|---|
| Example 1-1 | Titania, pore diameter of 4 nm, membrane thickness of 1 μm | 500° C., five hours | Rejection: 70% ⇒ 71% Pure water permeability: 1.8 ⇒ 1.7 $m^3/m^2$/day |
| Example 1-2 | Silica, pore diameter of 2 nm, membrane thickness of 0.5 μm | 800° C., three hours | Rejection: 91 ⇒ 91% Pure water permeability: 0.8 ⇒ 0.8 $m^3/m^2$/day |
| Example 1-3 | DDR-type zeolite, membrane thickness of 10 μm | 1000° C., one hour | Mixed gas separation factor: 30 ⇒ 32 |

With regard to the rejection amount in Table 1, polyethylene glycol having an average molecular amount of 8,000 and dissolved in water was filtered through a prepared separation layer (the inorganic separation membrane), and the rejection amount was calculated by the following equation (1):

$$\text{Rejection} = (1 - (\text{permeation-side concentration/original liquid side concentration})) \times 100 \quad (1)$$

Moreover, the pure water permeability was converted at a temperature of 25° and with a membrane pressure difference of 1 kgf/cm².

With regard to the mixed gas separation factor, a mixed gas of $CO_2/CH_4 = 50/50$ was passed at room temperature, and the separation factor was calculated by the following equation (2):

$$\text{Separation factor} = ((1 - \text{permeation side } CH_4 \text{ concentration})/\text{permeation side } CH_4 \text{ concentration})/((1 - \text{feed side } CH_4 \text{ concentration})/\text{feed side } CH_4 \text{ concentration}) \quad (2)$$

As shown in Table 1, for example, in Example 1-1, the rejection amount before regeneration was 70%, whereas the rejection amount after regeneration was 71%; the pure water permeability before regeneration was 1.8 $m^3/m^2$/day, whereas the amount after regeneration was 1.7 $m^3/m^2$/day; and the membrane performances did not change before and after regeneration. Even in another example, the membrane performances before and after the regeneration did not change, and it has been indicated that the ceramic filter can be regenerated by the method of the present invention.

Next, Example 2, which included a silica membrane on a carbonaceous membrane, Comparative Examples 1 and 2, which included only a carbonaceous membrane layer, and Comparative Examples 3 and 4, which included only a silica membrane separation layer will be described.

Sample Preparation

In Comparative Example 1, a carbonaceous membrane was formed on the support body of the above Example 1 by a method of the above Example 2. In Comparative Example 2, a concentration of a polyamide acid solution of Comparative Example 1 was set to 10 mass % to form a thick membrane. That is, in Comparative Examples 1 and 2, a separation layer was a carbonaceous membrane. In Comparative Example 3, a silica sol obtained by hydrolyzing tetraethoxy orthosilane (TEOS) was formed into membranes on a support body five times to obtain the example. It is to be noted that a firing temperature was set to 400° C. in a nitrogen atmosphere. In Comparative Example 4, the number of membrane formation times was set to 15. That is, in Comparative Examples 3 and 4, a separation layer was a silica membrane. In Example 2, the same silica sol as that of Comparative Examples 3, 4 was formed into membranes on the carbonaceous membrane of Comparative Example 1 used as a support body three times, and fired at 400° C. in a nitrogen atmosphere. In Example 2, the silica membrane was formed on the carbonaceous membrane.

(Evaluation Process of Water/Ethanol Separation Performance)

Evaluation of a water/ethanol separation performance of a separation layer (separation factor (α) and water flux (Flux)) was performed with a permeation evaporating device of a mixed liquid of ethanol and water mixed at a mass ratio of 90:10. A separation layer was submerged into a beaker containing a fed liquid of a water/ethanol mixed liquid to solidify. A feed-side pressure of the mixed liquid was set to an atmospheric pressure, and a permeation-side pressure was set to 0.01 Torr with a vacuum pump. After elapse of a predetermined time after the start of the evaluation, a solid of a passed liquid precipitated at a cooling trap disposed on the permeation side was dissolved, and a water flux (Flux [kg/h·m²]) was obtained from a mass of the solid. The permeation liquid was introduced into a TCD gas chromatograph to obtain a concentration of the passed liquid.

(Calculation of Separation Performance)

As indexes of a separation performance of a separation layer, a water/ethanol separation factor α (water/ethanol) represented by the following equation (3) and a water flux (Flux [kg/h·m²]) represented by the following equation (4) were used. It is to be noted that the separation factor α is defined as a ratio of a permeation-side liquid composition ratio to a feed-side liquid composition ratio. In the following equation (3), Perm (water), Perm (ethanol) are volume concentrations [vol %] of water and ethanol passed through the membrane, respectively. Moreover, Feed (water), Feed (ethanol) are volume concentrations [vol %] of water and ethanol of a fed liquid, respectively.

$$\alpha(\text{water/ethanol}) = (\text{Perm(water)}/\text{Perm (ethanol)})/(\text{Feed (water)}/\text{Feed(ethanol)}) \quad (3)$$

$$\text{Flux} = Q/(A \cdot t) \quad (4),$$

in which Q: a passed liquid mass [kg], A: a separation layer area [m²] and t: a time [h].

TABLE 2

| No. | Material of separation layer | Support body | Number of membrane formation times of separation layer (membrane thickness) | Separation factor α | Flux of water (kg/m²/h) |
|---|---|---|---|---|---|
| Example 2 | Silica | Comparative Example 1 | 3 times (0.1 μm) | 45 | 1.3 |
| Comparative Example 1 | Carbon | (1) | 1 time (0.6 μm) | 2.1 | 8.1 |
| Comparative Example 2 | Carbon | (1) | 1 time (1.5 μm) | 40 | 0.15 |
| Comparative Example 3 | Silica | (1) | 5 times (0.15 μm) | 1.4 | 10 |
| Comparative Example 4 | Silica | (1) | 15 times (0.5 μm) | 38 | 1.1 |

As shown in Table 2, in Comparative Example 1, since the carbonaceous membrane was thin, large pores of the support body were not completely covered, and the separation factor was small. On the other hand, in Comparative Example 2, since the carbonaceous membrane was thickened, the separation factor increased, but the flux dropped. When the silica membrane is thin as in Comparative Example 3, the separation factor decreases. When the silica membrane is thickened as in Comparative Example 4, the separation factor increases, but the flux drops. Moreover, the number of membrane formation times is 15, and the number of steps required for manufacturing increases in this manner. In Example 2, since Comparative Example 1 was used as the support body, the number of the membrane formation times was three, and a performance equivalent to that of Comparative Example 4 could be obtained. It is to be noted that it has been confirmed that the separation membrane of Example 2 can be regenerated. The separation factor after the reproduction was 44, and the flux was 1.3.

As described above, the constitution is employed in which the carbonaceous membrane 12 having the selectivity and the permeability is formed as the separation membrane on the porous base member 11, and the silica membrane 1 is formed as the inorganic separation membrane on the carbonaceous membrane. In consequence, although the number of the membrane formation times of the silica membrane 1 is reduced, the ceramic filter 10 having excellent water flux and separation performance can be formed. The structure is employed in which the carbonaceous membrane 12 is formed between the inorganic separation membrane and the support body (the porous base member), so that the support body can be reused, even if the separation layer deteriorates.

A ceramic filter in which a silica membrane having a high separation performance and a high water flux is formed with less membrane formation times can preferably be used as a filter. A ceramic filter including a nano-level thin-membrane-like silica membrane formed on the inner wall surface thereof can be used in a portion where an organic filter cannot be used, for example, separation removal or the like in an acidic or alkaline solution or an organic solvent.

What is claimed is:

1. A ceramic filter comprising:
    a porous base member comprising a monolithic ceramic porous body having a plurality of cells defined by partition walls extending along a longitudinal extension axis of the porous base member; and
    a filter membrane consisting of a carbonaceous membrane, having a membrane thickness in a range of 0.1 μm to 2 μm, formed directly on each partition member defining an inner surface of each cell of the porous base member and an inorganic separation membrane formed on the carbonaceous membrane.

2. The ceramic filter according to claim 1, wherein the inorganic separation membrane is a membrane selected from the group consisting of a silica membrane, a titania membrane, a zirconia membrane and a zeolite membrane.

3. The ceramic filter according to claim 2, wherein the inorganic separation membrane comprises a silica separation membrane.

4. A method of treating a ceramic filter comprising a porous ceramic body defining a porous base member, a carbonaceous membrane formed directly on the porous base members and an inorganic separation membrane formed on the carbonaceous membrane, for reuse of the porous base member, the method comprising the steps of:
    thermally treating the ceramic filter at a temperature in a range of 500° C. to 900° C., when the inorganic separation membrane is deteriorated, to remove both the carbonaceous membrane and the deteriorated inorganic separation membrane from the porous base member;
    then forming a new carbonaceous membrane on the porous base member; and
    then forming a new inorganic separation membrane on the new carbonaceous membrane.

5. The method according to claim 4, wherein the inorganic separation membrane is a membrane selected from the group consisting of a silica membrane, a titania membrane, a zirconia membrane and a zeolite membrane.

6. The method according to claim 4, wherein the inorganic separation membrane comprises a silica separation membrane.

7. The method according to claim 4, wherein the carbonaceous membrane has a membrane thickness in a range of 0.1 to 2 μm.

* * * * *